(12) United States Patent
Tidwell

(10) Patent No.: US 6,603,482 B1
(45) Date of Patent: Aug. 5, 2003

(54) SCREEN SPACE EFFECTS UTILIZING THE ALPHA CHANNEL AND THE ALPHA BUFFER

(75) Inventor: Reed P. Tidwell, Centerville, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 09/494,597

(22) Filed: Jan. 31, 2000

(51) Int. Cl.$^7$ .................................................. G09G 5/36
(52) U.S. Cl. ........................ 345/592; 345/426; 345/589
(58) Field of Search ................................ 345/501, 545, 345/503, 426, 581, 589, 592, 530, 539, 591, 549, 629

(56) References Cited

U.S. PATENT DOCUMENTS

| | | |
|---|---|---|
| 4,177,579 A | 12/1979 | Peters et al. |
| 4,348,184 A | 9/1982 | Moore |
| 4,511,337 A | 4/1985 | Fortunato et al. |
| 5,227,863 A * | 7/1993 | Bilbrey et al. .............. 345/723 |
| 5,384,719 A | 1/1995 | Baker et al. |
| 5,874,967 A * | 2/1999 | West et al. .................. 345/592 |
| 6,204,859 B1 * | 3/2001 | Jouppi et al. ............... 345/592 |
| 6,466,224 B1 * | 10/2002 | Nagata et al. .............. 345/592 |

OTHER PUBLICATIONS

Akeley, "RealityEngine Graphics", Computer Graphics Proceedings (1993).
Duff, "Compositing 3–D Rendered Images", Computer Graphics vol. 19, No. 3 (1985).
Segal et al., "Fast Shadows and Lighting Effects Using Texture Mapping", Computer Graphics vol. 26 No. 2 (1992).
Porter et al., "Compositing Digital Images", Computer Graphics vol. 18, No. 3 (1984).

\* cited by examiner

Primary Examiner—Kee M. Tung
(74) Attorney, Agent, or Firm—Thorpe North & Western, LLP

(57) ABSTRACT

A method for using the alpha channel to generate screen space effects in a high fidelity, real time, computer graphics simulation system. The first step is providing a rendering engine with an alpha processing channel, a frame buffer that includes an alpha memory, and a post processor. Next, screen effect data is processed through the alpha channel. The third step is storing screen effect data in the alpha buffer memory. Then the screen effect data is applied to the frame buffer color data using the post processor. The primary screen effects that are desired to be generated through the alpha channel are double buffered overlays, accurate night scene rendering and edge blending attenuation at channel boundaries. Night scene rendering features include range attenuated slewable own-ship light lobes, non-attenuation of point lights and luminous polygons, and ambient lighting.

29 Claims, 2 Drawing Sheets

SCREEN SPACE EFFECTS UTILIZING THE ALPHA CHANNEL AND THE ALPHA BUFFER

TECHNICAL FIELD

This invention relates generally to the field of computer graphics display, and more particularly to using the alpha channel for generating screen space effects in a high fidelity computer graphics simulation system.

BACKGROUND ART

For a few years, 3D graphics systems designed for high end workstations have included what is known as an alpha (α) channel. The alpha channel is used for compositing images. That is, combining images to create a new image. Compositing is a good way to produce images since it is easy to do, where the rendering of images is more difficult and computationally expensive. If one portion of the image needs alteration, the whole image does not need to be generated. In fact, some portions of the compositing may not be rendered but have been optically scanned into memory. Then compositing may be the only way to combine them into the image.

The value of each pixel in a composited image is computed from the component images in some fashion. If the pixels are combined in an overlay, the pixels of the foreground must be given transparency values as well as their color values. This way a pixel's value is taken from the background image unless the foreground image has an opaque value for that pixel. Images can also be blended, so the final pixel value is a linear combination of the values of the two component values. To implement these and other operations in this group, each pixel is given an alpha value along with the normal red, blue, green (RGB) color values. The storage buffer area allocated for these alpha values is commonly known as the alpha buffer. The related hardware processing circuits are commonly known as the alpha channel. The alpha field generally has a value from 0 to 1, where 0 is transparent and 1 is opaque. This value may also be indexed into a lookup table containing transparency values.

The concept of an alpha channel has been formalized into graphics application programmer interfaces (APIs) such as OpenGL by Silicon Graphics or DirectX by Microsoft. If hardware acceleration of the alpha channel is needed, the RGBA (red-green-blue-alpha) scheme mandates a separate processing channel for processing the alpha values and memory storage for the alpha values in the frame buffer. A hardware implementation is required to accelerate all of the blending modes which are outlined in the defined APIs. For example, there are blend modes in which the 'source' alpha from the graphic accelerator hardware is blended with a 'destination' alpha previously stored in the frame buffer. This is the general case used in image compositing and this case is founded on 2 basic assumptions. First, alpha blending assumes that there is no information about the overlap of the coverage information within a pixel. All that is known is the alpha value. Second, the shape of the pixel area covered by any object is unknown but the total area covered is known. In this case, the alpha represents a fraction of the pixel area covered.

These assumptions lead to the result that when alpha is used to antialias edges and/or represent transparency in simulated real world objects, overlapping primitives must be processed in back to front order to obtain visually correct results. The usual practice in such scenarios is to turn off the antialiasing for the best performance through utilization of the Z-buffer. On the other hand, the antialiasing can be turned on for the best scene quality which produces a performance degradation from sorting the primitives.

Accordingly, some advanced graphics systems use an alternate method of anti-aliasing where each pixel consists of subpixels. This is known as subpixel antialiasing or multi-sample mode. For this type of antialiasing, the two basic assumptions of alpha compositing do not apply. The information about overlap coverage and the shape of the pixel area covered is known because of the storage of geometrically correlated subpixel information. Thus, a high quality antialiased scene can be produced from unordered primitives which eliminates the performance degradation due to sorting. In this method, antialiasing alpha coverage information is redundant. When graphics systems are using multi-sample mode, the alpha memory is not needed. It is nevertheless present to be compliant with graphics standards which require alpha storage. In subpixel antialiasing mode, alpha processing hardware is not needed except in the case of partially transparent polygons.

In addition to antialiasing, advanced graphics systems also desire to include advanced screen space effects. This includes effects such as the illumination effects of a vehicle mounted light source and the attenuation of the illumination due to the distance of an illuminated surface from the light source. This is known as range attenuation Other screen effects such as the simulation of dusk/night scenes, edge blending attenuation and double buffered bitmap overlays are also desired. The creation of such screen elements is conventionally performed through the graphics pipe before the pixel data enters the frame buffer. Elements such as generating lobes for vehicle-mounted light sources are normally taken care of in the rendering process. For example, U.S. Pat. No. 5,384,719 to Baker, incorporated by reference herein, teaches simulating the illumination effects of a vehicle mounted light source and these effects are produced through the rendering process. The problem with producing screen space effects during the rendering and conversion steps is that it adds significantly to the processing overhead and slows the graphics subsystem down. One way to overcome this problem is to provide dedicated hardware to take care of the screen effects. This increases the cost and hardware real estate requirements for a real time graphics simulation system.

It would be advantageous to provide a system and method for producing screen space effects in a real time graphics system without increasing the hardware required for graphic acceleration. In addition, it would be valuable to use a hardware graphics subsystem or alpha channel which is not utilized in real time graphic simulation systems. Accordingly, it would be an improvement over the state of the art to provide a new method and apparatus for utilizing the alpha channel which is redundant in multi-sample mode.

OBJECTS AND SUMMARY OF THE INVENTION

It is an object of the present invention to utilize an alpha channel for processing screen space effects.

It is another object of the present invention to utilize an alpha channel to process the illumination effects of a vehicle mounted light source.

It is another object of the present invention to utilize alpha buffer memory to store screen space effects data.

It is another object of the present invention to utilize a post processor to apply screen space effects to the color data in the frame buffer.

It is another object of the present invention to utilize the alpha channel to process range data for polygons in a simulated scene.

It is another object of the present invention to identify luminous primitives as they are rendered so that they will not be attenuated in the post processor.

It is yet another object of the present invention to utilize an alpha buffer to store range values.

The presently preferred embodiment of the present invention is a graphics accelerator with a frame buffer. The graphics accelerator includes an alpha processing channel. The frame buffer includes an alpha memory coupled to the alpha processing channel. Screen effect data is stored in the alpha memory and is rendered and transformed by the alpha processing channel. The post processor then transforms the screen effect data and applies screen effects to data in the frame buffer.

The method for the invention uses a graphics accelerator for screen effects. The first step is providing a rendering engine with an alpha processing channel, a frame buffer that includes an alpha memory, and a post processor. The next step is processing screen effect data through the alpha channel. The third step is storing screen effect data in the alpha buffer memory. The fourth step is applying the screen effect data to the frame buffer color data using the post processor. The screen space effects which may be applied are effects such as ship mounted landing light lobes, double buffered overlays, edge blending attenuation at graphics channel boundaries, and range attenuation.

These and other objects, features, advantages and alternative aspects of the present invention will become apparent to those skilled in the art from a consideration of the following detailed description taken in combination with the accompanying drawings.

DISCLOSURE OF THE INVENTION

Figure 1:
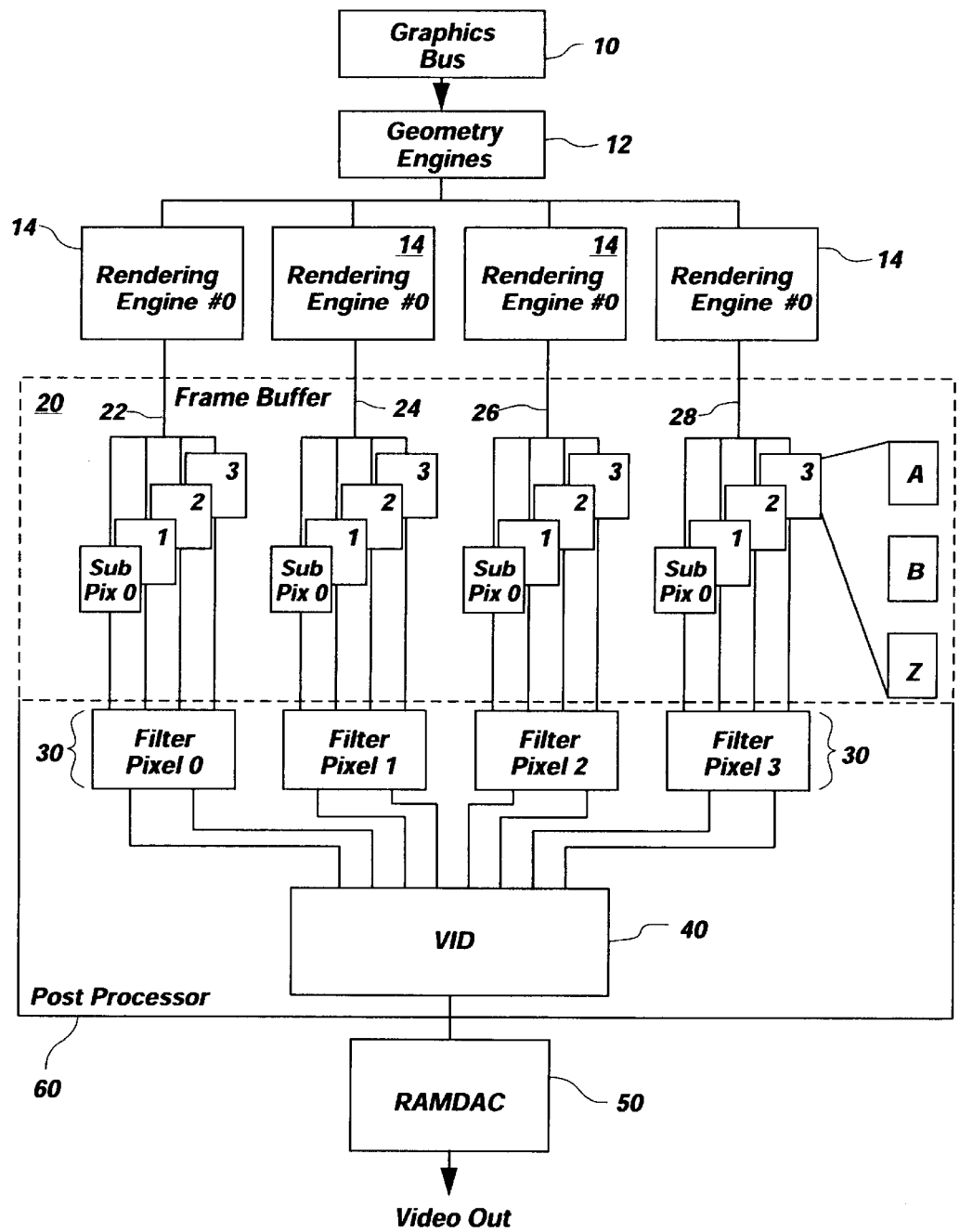
FIG. 1 shows a block diagram of a graphics card which uses the alpha channel for screen space effects.

Reference will now be made to the drawings in which the various elements of the present invention will be given numerical designations and in which the invention will be discussed so as to enable one skilled in the art to make and use the invention. It is to be understood that the following description is only exemplary of certain embodiments of the present invention, and should not be viewed as narrowing the claims which follow.

For real time graphics simulation, systems that incorporate a Z-buffer have diligently avoided ordering primitives to avoid paying the penalty it exacts on real-time performance. Instead, real-time systems utilize multiple sub-sample aliasing and screen-door transparency to provide high scene quality independent of rendering order. Furthermore, the two assumptions implicit in the conventional system of antialiasing and transparency are not true for these cases. The information about overlap coverage and the shape of the pixel area covered is known because of the storage of geometrically correlated sub-pixel information.

Manufacturers of high fidelity computer graphics simulation systems, have recently taken conventional, high volume graphics accelerators based on standard graphics platforms (e.g. OpenGL) and coupled many of them together to create low cost, parallel, subpixel antialiasing simulation systems. When using RGBA based systems, such as OpenGL, to produce subpixel antialiased real-time simulation results, the alpha channel is a redundant part of the system. With subpixel antialiasing, storage of alpha is redundant because pixel coverage is encoded in the subpixel mask (which subpixels are taken) making the computation of alpha redundant.

For transparency, the alpha channel may be required to interpolate transparency between vertices of a primitive or apply transparency texture. However, the transparency information is also encoded into a subpixel mask (screen door transparency) and is stored implicitly in the sub-sample data. Again, it can be seen that the storage of alpha values is redundant in a real time subpixel antialiasing system.

The current invention uses conventional graphics cards which use standard application programmer interfaces (APIs). An example of a standard API is OpenGL or Direct X. The current standards for most graphics APIs contain provisions for alpha channel acceleration in the hardware. As a result, most graphics cards which conform to a standard API contain an alpha channel or the memory and processing power to accelerate the alpha channel. The alpha memory is part of the frame buffer where rendered image data is stored.

As mentioned before, the alpha channel is conventionally used for the compositing of pictures and antialiasing of composited pictures. The present invention uses the alpha processing and alpha memory of a conventional graphics system to provide storage and processing for simulation specific features which would be much more costly if implemented in separate memory and/or using separate processing power. This is possible because the destination alpha normally used for blending is not needed for image generator style rendering, and storage of the alpha values in the frame buffer is not required in a real time simulator using multi-sample mode. In systems using subpixel antialiasing and screen door transparency, the alpha memory is not needed for antialiasing. Identifying this redundancy allows the alpha memory to be used for storing screen effects such as double buffered overlays, landing light lobes, and edge blending attenuation at image generator channel boundaries. Further, the alpha processing which would normally be applied to the alpha values can be applied to create and transform these screen effects.

More specifically, the present invention uses the conventional alpha channel available in open standard graphic accelerators (e.g. Open GL) for storing and processing vehicle landing light lobe patterns. This post processing method can also be used for range attenuation values and overlay plane primitives. Texture may also be applied to this data which is processed in the conventional alpha channel. Processing this data in the alpha channel is possible only in subpixel antialiased systems because the alpha channel of the graphic accelerator is redundant for opaque polygons since pixel coverage information is effectively encoded in the sample information. The advantage of using the alpha channel for these effects is that additional processing hardware and storage is not required during the rendering and transformation phase to produce the effects.

Using the alpha memory and post processing hardware also provides an efficient and accurate system to simulate dusk/night scenes. This includes producing vehicle mounted lighting on a ship within which the viewer is simulated to be riding (own-ship lighting) by post-processing a daylight scene rendered into the frame buffer. A dusk or night scene is simulated by modulating the intensity of a scene originally rendered with daylight brightness. Using the alpha channel for screen space effects is important for dusk or night simulation because of the lighting elements needed.

To simulate an own-ship light lobe pattern (single or double buffered), the pattern is stored in the alpha field of the frame buffer. This pattern may be loaded as a bit map or rendered through the graphic accelerator alpha channel. If the pattern is double buffered that allows the smooth simulation of the dynamic motion of the lobe. This is known as slewable lobes.

A second important element of night scenes which can utilize the alpha channel is range attenuation. When range attenuation is implemented, it is based on a range function calculated at the vertex of each polygon and processed through the graphics accelerator in the alpha channel at the same time the polygon is rendered. The attenuation is looked up in a table which means an arbitrary lobe attenuation as a function of range can be used. On occasion, polygons which use transparency must use the alpha channel for processing. When this is the case, an alternate method of generating the range value to be stored in the alpha field is provided in hardware or software. For example, the range could be loaded as a constant or generated some other way. Only a tiny fraction of primitives rendered in a scene will have transparency. Even for transparent polygons, range attenuation is stored in the alpha buffer of the frame buffer.

Another feature of the present invention is the non-attenuation of point lights and luminous polygons. Luminous primitives are self-illuminating and should not be attenuated. This invention makes use of a "luminous bit" stored in the frame buffer (for instance in the window ID field) on a subpixel basis. The luminous bit is stored in the WID field because there is a WID stored for each subpixel allowing the luminous primitives to be identified at the subpixel level for smooth filtering of the edges. It should be recognized that other storage such as the stencil bits could also be used for the luminous bits. Then when the frame is post processed as a night/dusk scene, attenuation is applied to make the scene appear as though it is night. In the present invention, the subpixels marked luminous are not attenuated during post processing. This happens before all of the subpixels are filtered into the single pixel value that is displayed.

Another element of the current invention is the independent control of ambient lighting. The ambient light level may be adjusted independently of the lobe pattern. This is done by multiplying the lobe pattern by a scale factor and then adding an offset.

Simulation lighting using own-ship lighting is not new of course, but this method of producing screen space effects has not be used before. Not only are the landing lights done as a post process to the frame buffer, but the range attenuation is performed in post processing. Processing range attenuation through the alpha channel provides a per pixel double buffered range value. In most prior art systems, own-ship lighting is done in the graphics pipe before the frame buffer when the Z depth or range is available in the pipe. Hardware to do this is not available in low-end graphics accelerators because it is not part of the graphics APIs (such as DirectX or OpenGL). Therefore, own-ship lighting for real time simulations must be either calculated and applied to the polygon vertices as part of the geometry processing (at significant computational cost) or done as a post process to the frame buffer. The most difficult problem of doing own-ship lighting as a post process is range attenuation, since in some graphics systems Z or depth is single buffered (meaning that it is not valid during video scanning). In most systems, particularly in ones using single port memory, it is not even scanned out of the frame buffer. Therefore, no range attenuation is used in other systems doing own-ship lighting as a post process.

Another advantage of the current invention is that the lobe pattern can be rendered through the alpha channel using polygons and texture maps with very high bandwidth. This type of processing along with double buffered lighting lobes makes slewable or rotatable lobes practical. Bitmap lobes can also be used with this invention and loaded into the alpha channel for further processing.

The method in the current invention provides antialiased point lights and luminous polygons which remain at a constant brightness inside or outside of the lobe. This is because they are identified with the "luminous bit" and are filtered differently. Without this bit, point lights and luminous polygons are indistinguishable from other primitives. So, in a post process, they would get attenuated along with everything else and appear brighter inside the lobe than out. In prior art systems, where own-ship lighting is done prior to storage in the frame buffer, point lights are identified as such in the graphics pipeline and bypass the own-ship lighting modulation. In prior art systems, no such identification of luminous primitives is stored in the frame buffer.

The preferred embodiment of the present invention will now be described in further detail. FIG. 1 shows the elements of the graphics processing pipeline with an alpha channel and alpha buffer. The elements of the invention consist of alpha channel processing in the rendering engine 14, alpha memory in the frame buffer 20, and processing in the post processor 60.

The frame buffer memory 20 is implemented using one or more DRAMs or other types of video memory. The preferred DRAM is the Mitsubishi 3D-RAM because of its advantages over conventional video RAM (VRAM). 3D-RAM is a combination of DRAM, SRAM, and logic on the same silicon chip which provide advantages over conventional DRAM used for frame buffers.

The memories are interleaved into four banks 22, 24, 26, 28 and organized as four columns along a scan line. Each bank is capable of storing one quarter of a 1280×1024 frame with four subpixels per pixel (labeled as SubPix 0, 1, 2 3 ). Each subpixel contains 96-bits of data including pixel color, Z depth, transparency, window ID, and overlay plane.

Four subpixel memory enables are provided by each of the four rendering engines 14 which are coupled to the frame buffer 20. These enables are activated according to an area-based antialiasing algorithm. As data is written to the frame buffer 20, the enables are used to selectively write data into the each subpixel. The preferred rendering engines which are desired to be used are the professional 3D graphics chip produced by Evans & Sutherland Computer Corporation which is sold under the trademark REALimage. The rendering engine can also be connected to one or more geometry engines 12 which are connected in turn to the system graphic bus 10. The system graphics bus 10 may be an AGP (Accelerated Graphics Port) bus, PCI bus or some other industry standard graphics bus.

For video scanning, 4 pixels are accessed in parallel, (identified as Pixel 0, Pixel 1, Pixel 2, Pixel 3 ). Each pixel consists of A, B, and Z data for each subpixel (identified as SubPix0–3 ).

Tables 1–4 show how the data is stored in the frame buffer. Note that each cell in these tables represents a double-buffered portion of a subpixel as defined by the number in parenthesis.

TABLE 1

Frame Buffer A or B Display Planes

| A/B | Subpixel 0 | Subpixel 1 | Subpixel 2 | Subpixel 3 |
|---|---|---|---|---|
| Pixel 0 | RGBA (32) | RGBA (32) | RGBA (32) | RGBA (32) |
| Pixel 1 | RGBA (32) | RGBA (32) | RGBA (32) | RGBA (32) |
| Pixel 2 | RGBA (32) | RGBA (32) | RGBA (32) | RGBA (32) |
| Pixel 3 | RGBA (32) | RGBA (32) | RGBA (32) | RGBA (32) |

The Alpha Plane will now be discussed. The frame buffer destination-alpha blend function is not used in the frame buffer so that the alpha portion may be reserved for other values. These values include: own-ship lighting, inverse range values and lobe patterns. Another use for the alpha plane or buffer is edge blending for channel video blending. Further, the alpha plane may also be used for the Overlay Color Index and Overlay Alpha for the overlay plane.

Table 2 shows how the alpha plane is utilized. (OVL is an acronym for Overlay)

TABLE 2

Detail of the Alpha Buffer Memory Allocation

| Alpha | Subpixel 0 | Subpixel 1 | Subpixel 2 | Subpixel 3A | Subpixel 3B |
|---|---|---|---|---|---|
| Pixel 0 | OVL Color Index (8) | OVL Alpha (8) | Inverse Range (8) | Lobe 0 pix 0,1 (8) | Lobe 1 pix 0,1 (8) |
| Pixel 1 | OVL Color Index (8) | OVL Alpha (8) | Inverse Range (8) | Edge Blend pix 0 (8) | Edge Blend pix 1 (8) |
| Pixel 2 | OVL Color Index (8) | OVL Alpha (8) | Inverse Range (8) | Lobe 0 pix 2,3 (8) | Lobe 1 pix 2,3 (8) |
| Pixel 3 | OVL Color Index (8) | OVL Alpha (8) | Inverse Range (8) | Edge Blend pix 2 (8) | Edge Blend pix 3 (8) |

The overlay plane uses order dependent alpha antialiasing. Objects written to the overlay plane are defined by industry standard APIs such as OpenGL, VAPs, or AVIDs and will mostly consist of symbology.

Subpixels 3A and 3B provide storage for the own-ship lighting patterns. These patterns are double-buffered and may be controlled independently of the video frame buffer swap. The patterns are defined at every other pixel in X and every pixel in Y.

Subpixels 3A and 3B also provide storage for a single edge-blending pattern. The pattern is single-buffered and is assumed to be static and defined by projector placement. The pattern is defined at the pixel resolution in both X and Y.

The data fields shown in Table 2 (overlay color, overlay alpha etc.) are stored in the alpha field (most significant byte) of the A and B color buffers. The sample number and pixel number index into the table. Samples 3A and 3B are shown separately in FIG. 1. The data in pixel samples 0–2 are double-buffered with A and B buffers corresponding to A and B color data respectively. The Overlay Color Index, Overlay Alpha, and Inverse Range are stored for each pixel and are double-buffered. Edge Blend values are stored for each pixel and are single-buffered. Own-ship lighting lobe patterns are stored per pixel pair and are double-buffered with the select performed in the Filter chip via a WAT (Window Attribute Table).

The Z Memory Plane also contains certain data. The Z memory plane contains the Window ID (WID), the Stencil bits, the Luminous (LUM) bits, and the Z depth. Note that the Z plane is not double-buffered. The Window ID bits allow only the exposed portions of the window to be updated, and the Stencil bits provide the ability to clip primitives to an arbitrary shape defined by the stencil.

TABLE 3

Z Memory Plane

| Z | Subpixel 0 | Subpixel 1 | Subpixel 2 | Subpixel 3 |
|---|---|---|---|---|
| Pixel 0 | Z (32) | Z (32) | Z (32) | Z (32) |
| Pixel 1 | Z (32) | Z (32) | Z (32) | Z (32) |
| Pixel 2 | Z (32) | Z (32) | Z (32) | Z (32) |
| Pixel 3 | Z (32) | Z (32) | Z (32) | Z (32) |

Referring now to Table 4 below, the WID bits in the Z plane are used for the Out-the-Window plane for luminous object own-ship lighting control per subpixel. The LUM flags are used to define subpixels which contain luminous polygons or point lights. The LUM flag is double buffered by allocating two bits that are written to or read from in alternate fields. N.U. represents bits that are not used.

TABLE 4

Detail of the Z Buffer WID/luminous Memory Plane

| WID | Subpixel 0 | Subpixel 1 | Subpixel 2 | Subpixel 3 |
|---|---|---|---|---|
| P0 | WID (2), LUM (2) | N.U. (2), LUM (2) | N.U. (2), LUM(2) | N.U.. (2), LUM (2) |
| P1 | WID (2), LUM (2) | N.U.. (2), LUM(2) | N.U.. (2), LUM(2) | N.U. (2), LUM (2) |
| P2 | WID (2), LUM (2) | N.U.. (2), LUM(2) | N.U. (2), LUM (2) | N.U. (2), LUM (2) |
| P3 | WID (2), LUM (2) | N.U. (2), LUM(2) | N.U. (2), LUM (2) | N.U. (2), LUM (2) |

Space in the frame buffer is allocated for two own-ship light (OSL) source maps. The maps are defined at every other pixel in X and every pixel in Y. One pattern is displayed at a time, thus while one is displayed, the other may be loaded. This allows patterns to be changed dynamically, simulating turning individual light sources on and off and slewing the lobes. Enable bits located in the WAT (Window Attribute Table) enable this feature and select which pattern is displayed. Point lights and other self-luminous objects are not attenuated by the pattern.

Own-ship lighting range attenuation is applied to the screen space pattern to simulate the projection of light sources onto the illuminated surface. Inverse range is defined at each vertex and interpolated over the polygon. An inverse range is stored in the frame buffer for each pixel.

The inverse range for each pixel is used to address a Range Attenuation Look-Up Table (RAT LUT). The LUT contains an attenuation function that modifies the own-ship lighting pattern. This table correlates the distance with a pre-determined amount of attenuation.

The own-ship lighting (OSL) as related to the ambient light Scale and Offset will now be covered. The own-ship lobe pattern is an eight-bit unsigned number that represents lobe intensity ranging from 0.0 to almost 1.0. Because OSL is applied as a post video process in this invention, the color data in the video stream is attenuated based upon the OSL pattern. At night or dusk, the ambient lighting must be maintained and not attenuated. Therefore, ambient lighting must influence the OSL curve.

Figure 2:
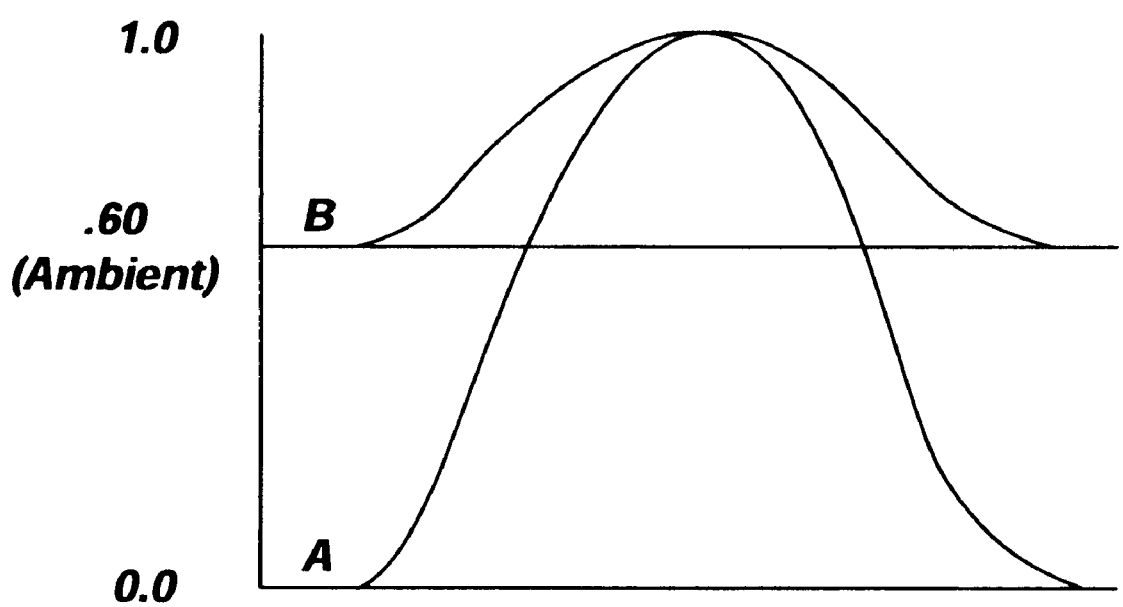
FIG. 2 is the graphical relationship between vehicle mounted lighting attenuation and ambient lighting.

In the present invention, two screen-space state constants are defined to accomplish the relationship between own-ship lighting and ambient light. They are OSLScale and OSLOffset. The relationship between these values is defined as follows:

OSLOffet=Ambient Light (fraction of full daytime brightness)
OSLScale=1.0- OSLOffset FIG. 2 shows this relationship graphically. The curves represent a cross section of a OSL pattern. Curve A is the original pattern and Curve B is the pattern after being scaled and offset so that it is not allowed to attenuate to a level that is less than the ambient light level, which is 0.60 in this example.

TABLE 8

Own Ship Lighting Scale and Offset Description

| Field | Bits | Description | Reset Value | R/W |
|---|---|---|---|---|
| OSLScale | 15:8 | Ownship Lighting Scale | 0x00 | R/W |
| OSLOffet | 7:0 | Ownship Lighting Offset | 0x00 | R/W |

Edge blending is used to control the intensity of the video stream. Adjacent video projectors with complementary edge blend functions may be used to display a wide channel of video. Edge blending is purely a video attenuation function defined at each pixel, and it is applied after own-ship lighting and overlay. The data is scaled so that it will either pass without modification or attenuate the data. The edge blend pattern is written defined in screen space by writing to appropriate planes in the frame buffer. The edge blend pattern is enabled using an enable bit located in the WAT (Window Attribute Table).

Referring again to FIG. 1, the post processor 60 transforms the screen effect data and applies it to the color data in the frame buffer for display on a video device. More specifically, the filter chip 30 blends four subpixels into a single pixel. Each subpixel is given an equal weighting which produces a simple 1 by 1 flat top filter. Thus, the entire screen is antialiased without impact to render fill-rate.

Luminous polygons or point lights (primitives) are filtered separately from non-luminous polygons. This allows own-ship lighting to attenuate non-luminous primitives and not the luminous primitives. A LUM bit is stored for each subpixel that defines if the object stored is luminous. The luminous and non-luminous video streams are then added together and saturated. A scale and offset are applied to the own-ship pattern, which allow the attenuation effect to be controlled to match the ambient light level.

Two pixel-rate own-ship lighting patterns are stored in subpixel 3A and 3B memory planes in the frame buffer. The inverse range to the pixel is stored in the subpixel 2 memory plane. The inverse range addresses a range attenuation function for each pixel. The indirection function produces an attenuation value that is applied to the current own-ship lighting pattern value. The ownship lighting patterns are double-buffered and may be controlled independently of the video frame buffer swap.

As shown in FIG. 1, the VID chip 40 combines filtered pixels from the filter chips 30 into two streams, applies post-processing effects, applies edge blending, and then sends the two pixel streams to the RAMDAC. In the preferred embodiment of the invention, a Xilinix Virtex FPGA (field programmable gate array) is used to implement these functions.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for using a graphics accelerator for screen effects in a real time simulation system, comprising the steps of:
   (a) providing a rendering engine with an alpha channel, and a frame buffer having an alpha memory and a post processor;
   (b) storing screen effect data in the alpha memory; and
   (c) applying the screen effect data using the post processor to frame buffer color data.

2. The method as in claim 1 wherein step (b) of storing the screen effect data further comprises the step of processing the screen effect data through the alpha channel.

3. The method as in claim 1 wherein the step of storing screen effect data includes rendering at least one own-ship lighting lobe screen effect and storing the at least one own-ship lighting lobe in the alpha memory.

4. The method as in claim 1 wherein the step of storing the screen effect data further comprises loading the screen effect data from a bitmap.

5. The method as in claim 1 further comprising the step of applying a range attenuation to the screen effect based on a range of each pixel.

6. The method as in claim 5 including calculating the range of each pixel by interpolating from a range for each vertex using the alpha channel.

7. The method as in claim 5 including loading the range of each pixel as a constant and storing the range for each pixel while it is being rendered.

8. The method as in claim 1 wherein the step of storing screen effect data includes storing a lighting pattern.

9. The method as in claim 8 further comprising applying a range attenuation to an own-ship light lobe pattern based on a range calculated at each pixel of each polygon through the alpha processor while the polygon is being rendered.

10. The method as in claim 1 wherein the step of storing the screen effect data includes identifying point lights and luminous objects and avoiding applying an own-ship light lobe pattern to the point lights and luminous objects.

11. The method as in claim 10 wherein the luminous objects are luminous polygons.

12. A graphics accelerator with a frame buffer, used in a real time simulation system, comprising:
   (a) an alpha processing channel;
   (b) an alpha memory coupled to the alpha processing channel, wherein screen effect data rendered in the alpha processing channel is stored in the alpha memory and then applied to the frame buffer; and (c) a post processor wherein screen effects are applied to frame buffer color data.

13. The graphics accelerator as in claim 12 wherein the screen effect data is a double buffered overlay.

14. The graphics accelerator of claim 13 wherein the overlay consists of a color index and an overlay alpha factor by which an overlay color is blended with frame buffer color data.

15. The graphics accelerator of claim 13 wherein the overlay alpha factor is processed through the alpha channel.

16. The graphics accelerator of claim 13 wherein the overlay alpha factor is stored in the alpha memory of the frame buffer.

17. The graphics accelerator as in claim 12 wherein the screen effect data simulates own-ship lights.

18. The graphics accelerator as in claim 12 wherein the alpha memory contains a plurality of pixels and an own-ship lighting pattern is defined by X and Y location.

19. The graphics accelerator as in claim 12 wherein the screen effect data is edge blending attenuation patterns.

20. The graphics accelerator as in claim 12, wherein the alpha memory further comprises a plurality of subpixels and a luminous bit corresponding to each subpixel to define subpixels taken by luminous polygons and point lights.

21. The graphics accelerator as in claim 12, wherein the alpha memory further comprises a plurality of pixels and subpixels and an inverse range field corresponding to each pixel.

22. The graphics accelerator as in claim 12, wherein the alpha memory further comprises a plurality of pixels and subpixels and an edge blending value is stored for each pixel.

23. A method for simulating night scenes and own-ship lighting using a graphics accelerator with a frame buffer, comprising:

(a) storing a ship mounted lighting pattern in an alpha memory of the frame buffer;

(b) generating range values for pixels based on a range calculated for vertices of a polygon and interpolated through the alpha channel when the polygon is rendered;

(c) processing the range values and applying range attenuation to the own-ship lighting pattern as a post process to the frame buffer when pixels are scanned out of the frame buffer for display; and (d) avoiding attenuation of point lights and luminous polygons by checking a luminous bit stored in the alpha memory at a subpixel level and not attenuating the respective subpixels.

24. The method as in claim 23 further comprising the step of adjusting the ambient lighting independent of the ship mounted lighting pattern intensity.

25. The method as described in claim 23 wherein the step of processing the range thorough an alpha processing channel further comprises processing the range values through the alpha channel to derive a double buffered range value for each pixel.

26. The method as described in claim 23 wherein the step of adjusting the ambient lighting further includes multiplying the lobe pattern by a scale factor and adding an offset.

27. The method as described in claim 23 further comprising double buffering the ship mounted lighting pattern to allow for smooth simulation of lobe movement.

28. The method as described in claim 23 further comprising loading the ship mounted lighting pattern as a pre-rendered bitmap.

29. The method as described in claim 23 further comprising rendering the own-ship lighting pattern through the alpha channel.

* * * * *